Patented Nov. 1, 1927.

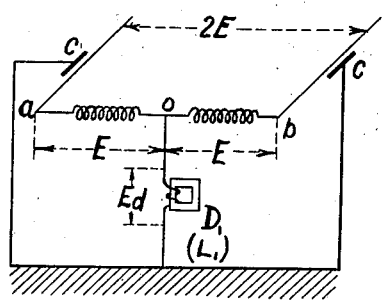
Fig.1.
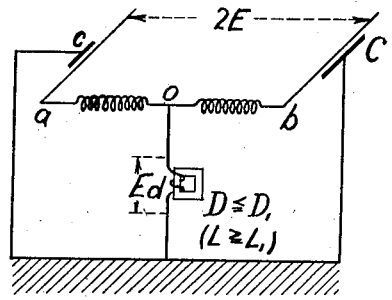
Fig.4.
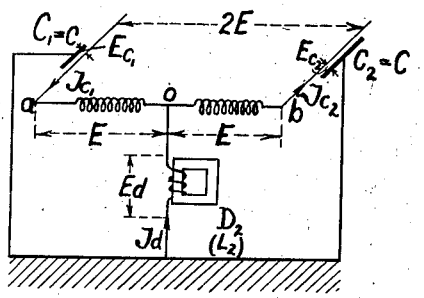
Fig.2.
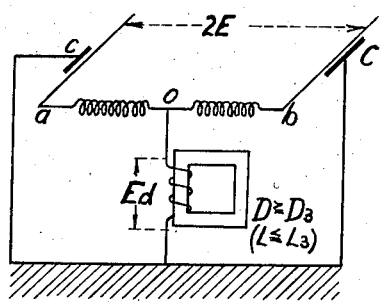
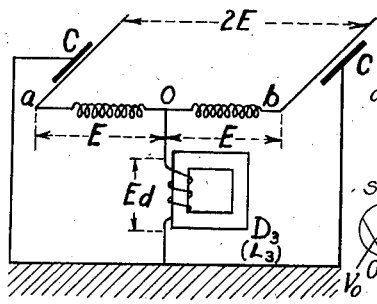
Fig.3.
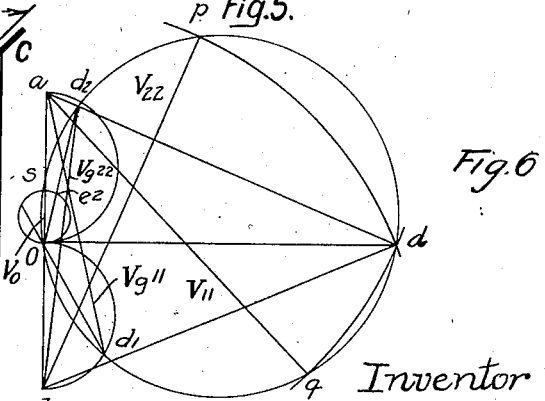
Fig.5.
Fig.6
Inventor
Julius Jonas
By Marks & Clerk
Attys.

1,647,869

UNITED STATES PATENT OFFICE.

JULIUS JONAS, OF BADEN, SWITZERLAND, ASSIGNOR TO AKTIENGESELLSCHAFT BROWN, BOVERI & CIE., OF BADEN, SWITZERLAND.

APPARATUS FOR DIMINISHING INJURIOUS EARTHING CURRENTS.

Application filed August 29, 1921, Serial No. 496,279, and in Switzerland December 23, 1918.

It has already been proposed to suppress earthing currents in earthed high pressure nets having a capacity symmetrically distributed over the phases of the net, by the inclusion of suitably dimensioned throttling coils in the earthing circuit. The dimensioning of the earthing throttling coil in the case of monophase current is effected according to the equation $$L = \frac{1}{2\omega^2 C}$$

where L is the inductance of the throttling coil, $\omega$ is the frequency of the net, and C is the partial capacity of a phase of the net relatively to earth, i. e., the capacity value which determines the capacity currents flowing to earth from the phase.

In the accompanying diagrammatic drawings:—

Figures 1 and 3 represent two symmetrical single-phase networks;

Figures 2, 4 and 5 represent three asymmetrical single-phase networks.

Figure 6 is a vector diagram of the electrical factors of a single phase network according to the invention.

Figures 1 and 3 show two symmetrical single-phase nets, which only differ in the size of the partial capacity of their net conductors relatively to earth. Whereas in Figure 1 the partial capacities of each conductor are represented by $c$, in Figure 3 they are represented by C in order to give an obvious indication of the difference in size. $oa$ and $ob$ represent the halves of the winding of a single-phase generator, E the phase voltage of each of these halves. Hence the total voltage of the generator or of the net$=2E$. For the purpose of suppressing the earth current, in a net according to Figure 1 a throttling coil $D_1$ is inserted between the voltage zero point $o$ of the net and earth, the inductance $L_1$ of the choking coil being determined by the sum of the two partial capacities $(c+c)$, so that $$L_1 = \frac{1}{2\omega^2 c}$$

should be chosen. In a net as shown in Figure 3, however, the inductance $L_3$ of the throttling coil $D_3$ was given the correspondingly smaller value:

$$L_3 = \frac{1}{2\omega^2 C}.$$

Since in the case of an earth connection, the voltage at the earthing coil is equal to E and as the smaller inductance corresponds to the larger current, the coil $D_3$ must be dimensioned for a kilovoltampere figure, which is greater by $$\frac{L_1}{L_3} = \frac{C_3}{C_1}$$

than that of the coil $D_1$ or, in other words: In symmetrical nets the size of the earthing coil must be made proportional to the size of the partial capacities of the net conductors relatively to earth. Accordingly in Figures 1 and 3 the throttling coils $D_1$ and $D_3$ respectively are shown dimensioned to suit the capacities $c$ and $C$ respectively.

If, however, as shown in Figure 2, it is a case of a non-symmetrical net, in which the partial capacity $C_1$ ($=c$) in one net conductor is smaller than the partial capacity $C_2$ ($=C$) of the other net conductor relatively to earth, then it is clear that it is impossible to suppress the earthing currents entirely by suitably dimentioning the throttling coil situated at the zero point of the net, because however great the inductance of the throttling coil may be made, the non-symmetry of the arrangement in relation to its electrical factors remains, and can only be compensated by another non-symmetrical factor. This may be done, for instance, as follows, namely, instead of connecting the throttling coil to the zero points of net, it is connected to a pressure point of the generator (transformer or the like). In earthing a phase-conductor, then the capacity current at the earthing point is still influenced by the pressure 2E where E is the phase-pressure or pressure between an external conductor and the neutral point of the system. For the throttling coil current however the pressure $E_1$ or $E_2$ comes into question according as the capacity $C_1$ or $C_2$ is bridged by the earthing connection, where $$E_1 \gtreqless E; \quad E_2 \lesseqgtr E$$

and $E_1 + E_2 = 2E$.

The dimensions of the throttling coil can then be calculated as follows:—

For the earth connection at $C_2$ the ratio between the effective values must be:—

(1) $\quad J_{C1} = J_D$; and therefore $2E\omega C_1 = \dfrac{E_2}{\omega L}$

For the earth connection at $C_1$ the ratio between the effective values must consequently be:—

(2) $\quad J_{C2} = J_D$; and therefore $2E\omega C_2 = \dfrac{E_1}{\omega L}$

From (1) and (2) it follows that:—

(3) $\quad \dfrac{E_2}{E_1} = \dfrac{C_1}{C_2}$ and (4) $\quad E_1 + E_2 = 2E\omega^2 L(C_1 + C_2)$.

Since $E_1 + E_2 = 2E$, then for the complete suppression of the earthing currents $\omega^2 L(C_1 + C_2) = 1$, and therefore $$L = \dfrac{1}{\omega^2(C_1 + C_2)}$$

and (5) $\quad C_1 + C_2 - \dfrac{1}{\omega^2 L} = 0$.

If $C_1$ in Figure 2 is equal to $c$ in Figure 1, $C_2$ in Figure 2 is equal to $C$ in Figure 3, then the inductance $L_2$ of the throttling coil $D_2$ to be used in the nets shown in Figure 2 is:

$$L^2 = \dfrac{1}{\omega^2(c+C)}$$

and the kilovoltampere values of the coils corresponding to the inductances $L_1$, $L_2$, $L_3$ are as $$c : \dfrac{c+C}{2} : C$$

Therefore the earthing coil $D_2$ shown in Figure 2 represents in its size the mean value of the earthing coils $D_1$ and $D_3$ which are to be used for the nets shown in Figures 1 and 3.

From Equation (4) $E_1$ and $E_2$ can be determined and consequently the voltage point of the generator to which the choking coil should be connected. This can, however, only be effected with great difficulty, as the point of winding in question can often not be led out for practical reasons. If this is not effected and if the choking coil, as is usual and convenient, be connected to the middle point of the winding (neutral point) of the generator, the dimensions given for the choking coil (according to equation 5) will lead to conditions, which would endanger the normal working of the plant through the occurrence of great excess voltages (voltage displacements), which for the sake of clearness shall be examined in detail in connection with a one-phase network, the neutral point of which is earthed by such a choking coil.

In the accompanying Figure 2 such a phase net is shown diagrammatically. $o\,a$ and $o\,b$ represent the halves of the winding of a one phase generator and E the phase voltage in each of these halves. Hence the total voltage of the generator or of the net would $= 2E$. Further $C_1$ and $C_2$ represent the part capacities of the net conductors relatively to the earth $E_{C_1}$ and $E_{C_2}$ the voltages of the net conductors relatively to the earth; $D_2$ the throttling coil (inductance) introduced between zero point 0 and earth and $E_D$ the voltage of the said choking coil.

Finally let $J_{C_1}$ be the current flowing through the capacity $C_1$.

$J_{C_2}$ be the current flowing through the capacity $C_2$ and $J_d$ be the current flowing through the choking coil $L$.

Assuming the size of the part capacities $C_1$ and $C_2$ relatively to earth to be unequal, we obtain, if $C > C_1$ the equations (6) $\quad E = E_{C1} + E_D = \dfrac{J_{C1}}{\omega C_1} + J_D \omega L$ (7) $\quad 2E = E_{C1} + E_{C2} = \dfrac{J_{C1}}{\omega C_1} + \dfrac{J_{C2}}{\omega C_2}$ (8) $\quad J_{C2} = J_{C1} + J_D$ If $C_2 < C_1$, $J_D$ must be replaced by $-J_D$.

From these equations the correct $J_D$ in the throttling coil may be calculated, the resistances being left out of account.

(9) $\quad J_D = \dfrac{E}{\omega L} \cdot \dfrac{C_1 - C_2}{C_2 + C_1 - \dfrac{1}{\omega^2 L}}$ For $C_2 \lesseqgtr C_1$ and according to Equation (5) for $$C_1 + C_2 = \dfrac{1}{\omega^2 L},$$

$J_D$ becomes infinite and the voltage at the earthing throttling coil $E_D = J_D \omega L$ also becomes infinite, i. e., the dimensioning of the throttling coil lying at the zero point of the net with a view to the complete suppression of the ground currents leads to resonance phenomena in ordinary working and to dangerous excess voltages. As the potential of the earthed end of the throttling coil is fixed, the potential of the other end of the throttling coil, i. e., of the zero point of the net must vary in such a manner that the difference in voltage at the throttling coil assumes the value $J_D \omega L$, in the present case the value "infinity". Through the effect of the ohmic resistance of the throttling coil and the stray reactance of the windings forming the zero point of the net, while such a tremendous rise of the currents and voltages is prevented, there still remains the risk of damage to the installation by the dimensioning of the throttling coil solely with regard to the suppression of ground currents with nets having an asymmetrically distributed capacity.

According to the present invention for nets with an asymmetrically distributed capacity the ground currents are to be reduced to harmless dimensions, without dangerous resonance phenomena in the normally worked net being caused thereby. For this purpose between the zero point of the net and the earth a throttling coil of such proportions is to be introduced that as the utmost approximation to the value to be avoided, viz:

$$L = \frac{1}{\omega^2 (C_1 + C_2 + \cdots)}$$

for the inductivity of the throttling coil the expression $$L = \frac{1}{\omega^2 m \, C_x}$$

holds good, where $m$ = number of part capacities, for one phase current=2, for three phase current=3, for two phase current=4 is to be put and by $C_x$ the part capacity with regard to earth is to be understood which has the smallest or greatest part capacity with regard to earth.

In the equation $$J_D = \frac{E}{\omega L} \cdot \frac{C_2 - C_1}{C_2 + C_1 - \frac{1}{\omega^2 L}}$$

the denominator will then receive a value different from zero and the throttling coil current will therefore remain a finite quantity in normal working. If now for limiting it the equation is given the form $$L = \frac{1}{\omega^2 m \, C_x}$$

whence, for instance, with a one phase net $$L = \frac{1}{\omega^2 2 C_1} \left( \text{or} = \frac{1}{\omega^2 2 C_2} \right),$$

then the fraction $$\frac{C_2 - C_1}{C_2 + C_1 - \frac{1}{\omega^2 L}}$$

is always equal to 1 and thus according to equation $$(9) \quad J_D = \frac{E}{\omega L}$$

and $E_D = J_D \omega L = E$ the voltage at the earthing throttling coil in normal working. This value would also of itself be still too high but if it is taken into consideration that in the current circuits in question there is an ohmic resistance and stray reactance it will be seen that $J_D$ and $E_D$ will in reality still remain considerably below the deduced value, so that dangerous excess voltages need no longer be expected.

The suppression of the ground currents will become less perfect, but this drawback will in general not be very considerable. In quite extreme cases, that is, where there is strong asymmetry it is no longer possible to reduce the ground currents to a harmless quantity by means of an earthing throttling coil connected to the zero point of the net; in such cases the introduction of additional voltages in the earthing circuit is absolutely necessary. Hence the above rule for the dimensions provides a balance between two opposing disturbing moments in the case of earthed high voltage nets, namely the avoidance of voltage resonance during normal working and the prevention of harmful ground currents in the case of one phase of the net being earthed.

Figure 4 illustrates the case in which use is made in a net having the unequal partial capacities $c$ and $C$ of a throttling coil, which has the size of the coil $D_1$ in Figure 1, which thus corresponds to a symmetrical net, in which earth net conductor has the partial capacity $c$ with respect to earth. Figure 5 on the other hand illustrates the case in which use is made in the said non-symmetrical net of a throttling coil, which has the size of the coil $D_3$ in Figure 3, which thus corresponds to a symmertical net, in which each net conductor has the partial capacity $C$ with respect to earth. The reference letters in Figures 4 and 5 represent the same parts as in Figures 1 to 3. Therefore according to the invention, the earthing coil is either constituted by a coil adapted to suit the partial capacities relatively to earth, this coil being not greater than if all the net conductors possessed a partial capacity equal to the smallest present, or which is not smaller than if all the net conductors possessed a partial capacity equal to the largest present. Throttling coils of this kind have the great advantage as compared with those corresponding to the sum $(c+C)$ that they prevent the formation of the earth connection arc, without causing resonance excess voltages in the normal working of networks.

The limiting syntony (tuning limits) admits of being easily treated diagrammatically.

The Figure 6, $oa=+Ep$, $ob=-Ep$ denote the phase voltages of a single-phase network. $V_0$ the unbalanced voltage of the neutral point of the network to earth, $od=V_d$ the choking-coil voltage, $V_{11}$ and $V_{22}$ the voltage of the network phases to earth in the event of resonance syntony (tuning). In the range of non-synchronism $dp$ and $dq$, the voltage to earth is greater than $V_{11}$ and $V_{22}$ whereas in the range of non-synchronism $p\ o\ q$ it is less.

The positions of the vectors $od_1$ and $od_2$ of the choking-coil voltages for the limiting syntony may be determined in the following manner:—

Circles are described through $oa$ and $ob$. These circles cut the circle $o\ q\ d\ p$ in the points $d_1$ and $d_2$. The joining lines $od_1$ and $od_2$ then represent the desired choking-coil voltages $V_{d_1}$ and $V_{d_2}$. The associated vectors $V_g11$ and $V_g22$ are drawn, and it will be seen that they are considerably shorter than $V_{11}$ and $V_{22}$. That the construction is correct admits of being proved in the following manner:—

If C is the mean value of the capacity, $$\frac{C_1+C_2}{2}$$

the following proportion holds good:—

$$od_1:e_1d_1=ob:sb=C:C_1$$

now since $$\frac{od_1}{e_1d_1}=\frac{\omega L_1}{\frac{1}{\omega mC}}=\frac{\frac{1}{\omega mC_1}}{\frac{1}{\omega mC}}$$

$$\therefore \omega L_1 = \frac{1}{\omega mC_1}$$

Similarly $od_2:e_2d_2=oa:sa=C:C_2$ and since $$\frac{od_2}{e_2d_2}=\frac{\omega L_2}{\frac{1}{\omega mC}}=\frac{\frac{1}{\omega mC_2}}{\frac{1}{\omega mC}} \therefore \omega L_2 = \frac{1}{\omega mC_2}$$

Having now described my invention what I claim as new and desire to secure by Letters Patent is:—

Apparatus for preventing injurious earthing currents in earthed high tension networks, having a capacity asymmetrically distributed over the phases, characterized by the feature that a throttling coil, which is interposed between the zero point of the network and earth, has an inductance value of $$\frac{1}{\omega^2 mC_x}$$

where $\omega$ is the frequency; $m$ is the number of phase capacities relative to earth and $C_x$ is a capacity value outside the range lying between the highest and the lowest individual phase capacity relative to earth.

In testimony whereof I have signed my name to this specification.

JULIUS JONAS.